March 4, 1924.
C. E. NORTH
1,485,702
CONTINUOUS PROCESS OF EXTRACTING OIL FROM MILK
Filed May 29, 1923
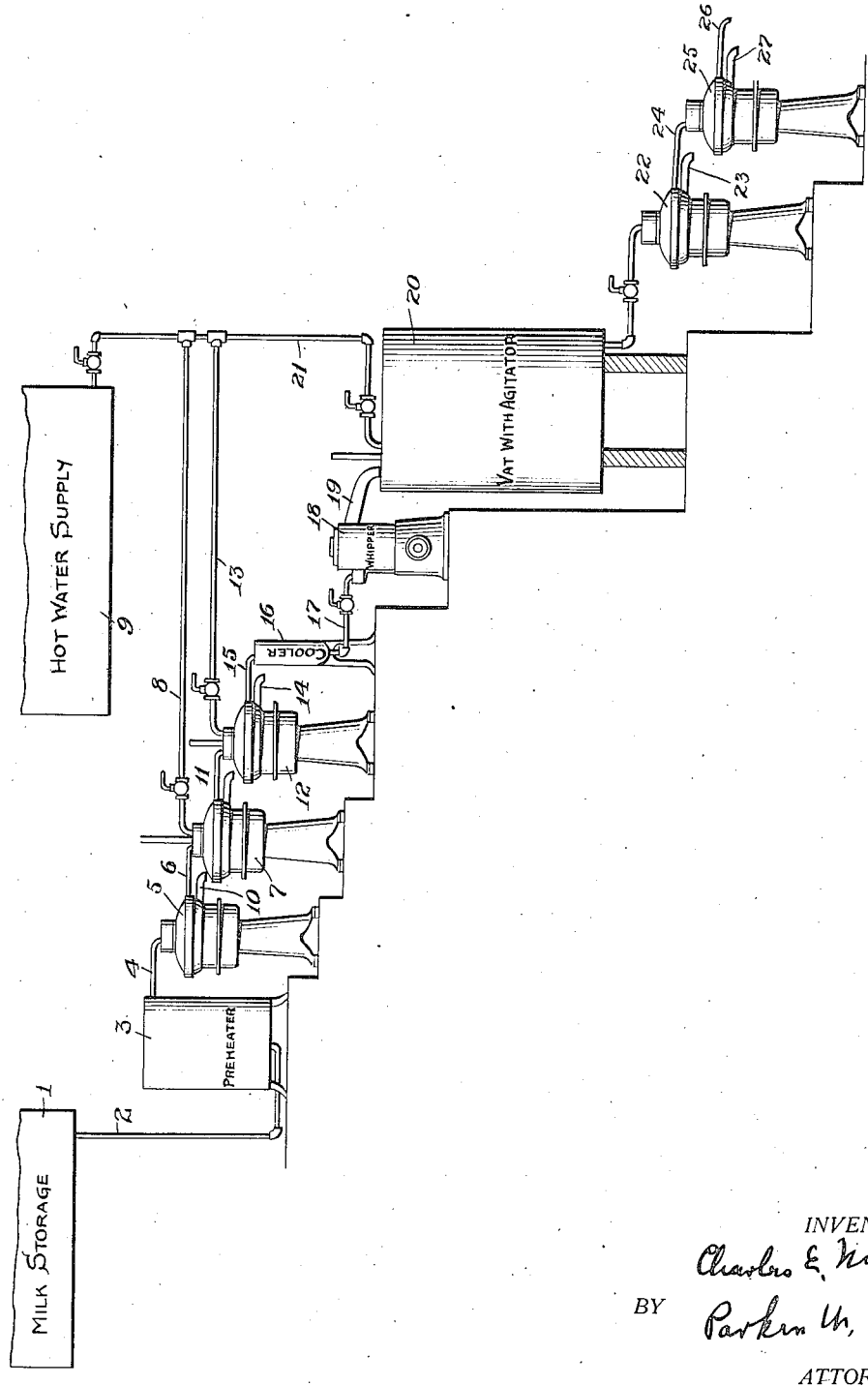
INVENTOR
Charles E. North
BY Parker W. Page
ATTORNEY Patented Mar. 4, 1924.

1,485,702

UNITED STATES PATENT OFFICE.

CHARLES E. NORTH, OF MONTCLAIR, NEW JERSEY, ASSIGNOR TO THE MILK OIL CORPORATION, OF WILMINGTON, DELAWARE, A CORPORATION OF DELAWARE.

CONTINUOUS PROCESS OF EXTRACTING OIL FROM MILK.

Application filed May 29, 1923. Serial No. 642,262.

*To all whom it may concern:*

Be it known that I, CHARLES E. NORTH, a citizen of the United States of America, residing at Montclair, in the county of Essex and State of New Jersey, have invented certain new and useful Improvements in Continuous Processes of Extracting Oil from Milk, of which the following is a full, clear, and exact description.

In the development of the art of extracting pure oil from milk, I have discovered and practiced many steps or methods of treating the material for which I have filed a number of applications for Letters Patent which are now pending. Without referring specifically to these numerous applications, it will suffice for present purposes to state that among the methods or process steps for breaking the emulsion of fat in milk or cream described therein there are included agitation, acidifying, dilution and heating, freezing, evaporation, coagulation of and washing out the casein.

For removing the casein and other solids not fat from the emulsion or from the milk fat the steps of dilution and centrifuging, coagulation and sedimentation, or centrifuging or filtration, acidifying and centrifuging and agitation; heating and centrifuging may be practiced.

Finally for removing or separating the water from the milk fat, after the emulsion has been broken, the steps of heating, decanting or draining, passing the mixture through centrifuges such as a cream separator, a whey separator or fat concentrator and an oil separator or drier may be resorted to or the mixture may be passed through a suitable filter with hydrophilic substances or evaporated or frozen, ground and otherwise treated.

From the above it is manifest that for the three main problems in the recovery of oil from milk, there are many solutions, which may be associated and applied in many ways and in many processes for the accomplishment of this object. But while the selection of one series of steps may provide a process of great scientific interest, it may possess but slight commercial value on account of its cost and inefficiency. Again, another selection may result in a commercially successful process, yet one which is inconvenient and cumbersome; as, for example, where interruptions in the continuity of the process requiring the handling of the products at different stages retard the final result, or where the production of materials in batches involves delays in the treatment of successively produced volumes.

From these considerations it will be seen that the greatest practical and commercial value of a process results from that selection and mode of application of steps which yields the largest volume of milk fat in the shortest possible period of time and which at the same time includes the lowest initial cost of the equipment, the lowest labor cost and the greatest convenience or facility of operation. Primarily, such a process must be completely continuous, free from all interruptions, purely automatic and one in which all steps of the complete process are carried out on the material in its different stages or conditions simultaneously.

After a long period of experiments, by careful selection of steps and by a happy application of the same, I have succeeded in developing such a process and upon this new and valuable achievement is based my present application for Letters Patent. My process, generally stated, is as follows:

Milk as brought in by the farmers is collected in a large tank and then raised to a temperature suitable for the most efficient separation of the cream by means of a centrifugal cream separator and in such warmed condition is passed continuously to such a device at the rate for which the separator is designed. From the skim milk spout of this separator the skim milk flows to a receptacle where it is stored for subsequent treatment for the production of milk powder. The cream from the cream spout flows directly into the dosing tank of a second centrifugal cream separator.

To this cream, before it enters the second separator, a regulated volume of water at its own temperature is run from a suitable source, the volume of water being preferably nine times that of the cream. This mixture is passed through said second separator with the result that a washed cream containing water and but ten per cent of the skim milk of the cream as received from the first separator is delivered from the cream spout while from the skim milk spout issues water with ninety per cent of the skim milk received. This wash water may be run off and discarded.

By a connecting pipe the washed cream is then run to a third cream separator and to it, before reaching the separator, is added a continuously flowing stream of water, in a volume approximately and preferably equal to nine times that of the washed cream. From this third separator issues a washed cream containing less than one per cent of the skim milk in the original or unwashed cream, and wash water with the balance of the skim milk is run off and discarded.

This washed cream flows by a suitable pipe connection to a cream cooler where its temperature as it flows over the cooling pipes or coils is reduced to about fifty-five degrees Fahrenheit, which is that best suited for agglomeration of fat globules under mechanical agitation. From this cooler the cream flows to and through an agitator or device for whipping it, and if the latter be properly constructed and operated at the right speed, the cream passes through this device in from less than one to two minutes and issues therefrom in a pasty mass.

This mass is discharged from the mouth of the whipper directly into a tank of warm water the temperature of which is maintained at about 100° F., or slightly above the melting point of the milk fat. Water is continuously delivered into this tank at the rate of about four volumes to one of the whipped cream, and the melting of the fat is promoted by a suitable agitator in the tank which thoroughly mixes the whipped cream and the water.

The melted and diluted fat is then led by a pipe directly to such a form of centrifuge as is commonly known as a whey separator, but which in reality is a fat concentrator, through which it passes, with the result that about 98 per cent of the water is discharged from one spout and the oil with only 2 per cent of water from the other. Should it be regarded as desirable, the water from the device may be passed back to the second or third cream separator in order that such oil as it may contain may be recovered, but in general the amount of such oil is very small.

The concentrated oil then flows direct to an oil drier or dehydrator, which is a special form of super-centrifuge which delivers from one spout the small amount of remanent water and from the other a pure clear oil containing less than five one-hundredths of one per cent of moisture and no milk solids not fat. This oil is run into cans and sealed up immediately for storage or transportation.

I have by this means developed a process which is entirely continuous and automatic. The farmers' milk is delivered in bulk to the series of devices described and in about ten minutes from the time when it reaches the first cream separator, substantially all of the oil runs out in a continuous stream from the last device of the series. All of the apparatus required for carrying out the process is placed and arranged so that the connections are short and direct; they are all operated by the power derived from the ordinary plants used in the usual creameries or milk factories, and they may all be installed in a very small space. For example, an installation of a capacity for thus handling 6,500 pounds of milk per hour, occupies a space of not over 40 feet long by 5 feet wide, and such a plant will, in handling milk containing 3½ per cent fat, receive, in an eight-hour run, 52,000 pounds of milk and turn out, in addition to the skim milk which is all conserved and treated to make milk powder, 1,820 pounds of pure milk oil. This is the theoretical limit of 100 per cent, but in actual practice the yield may be 1 per cent or 2 per cent less of the fat. Such a plant requires the attendance and care of never more than one skilled and one unskilled workman.

The series of devices used should preferably be placed so that the flow of the product from one to the next is by gravity alone, for which purpose the machines should be mounted on a series of steps, but if it is not convenient to arrange them all on one floor they may be installed on different floors. Such an arrangement obviates the necessity of pumping the product of one machine into another.

In the accompanying drawing I have shown the apparatus best adapted for use in carrying out this process. None of this apparatus is of my invention, whether the separate units or their combination be considered, but for purposes of the present case, no new or untried devices need be used for carrying out the process as a whole. In other words, each of the units is, or may be, of a construction now well known in the art and requires no specific description for its comprehension.

The drawing shows the several instrumentalities above described arranged for operation in the carrying out of my improved and novel continuous process.

These devices are shown as resting on a series of steps or successively lower levels whereby the product of one flows by gravity into the next of the series, and this is the best and most economical arrangement. The milk as brought in by the farmers is poured in bulk into a large storage tank 1. From this tank by a pipe 2 the milk is carried to a preheater 3 where its temperature is raised to about 100° F., and from this receptacle the warmed milk flows by a pipe 4 to an ordinary cream separator 5.

The cream spout 6 of this separator delivers the cream into the dosing tank of a second cream separator 7, where it is diluted by a stream of warmed water delivered by a pipe 8 from a supply tank 9 in the regulated amount of nine volumes of water to one of the cream. From the skim milk spout 10 the skim milk issues and from this it is or may be run off to a proper receptacle for further treatment.

From the second cream separator 7 a washed cream issues through the spout 11 by which it is delivered directly into the dosing tank of a third cream separator 12, where it is diluted with nine times its volume of warmed water by a pipe 13. The water with the remanent skim milk flows off through the pipe 14 and is discharged.

The cream spout 15 of the separator 12 delivers the washed cream to an ordinary cream cooler 16 from which the cooled cream runs direct by a pipe 17 into a whipper or agitator 18 driven at a relatively high speed, and from which the whipped cream is delivered by a pipe or spout 19 into a vat 20 which contains paddles or coils which constantly rotate and which thoroughly mix the whipped cream with the warm water which it contains and which has a temperature sufficiently high to melt the coalesced fat particles in said cream. This temperature need not be in excess of 100° F. and the water is delivered to the vat by a pipe 21 in the constant ratio of four volumes to one of the whipped cream.

From the bottom of the vat 20 the mixture of water and melted fat is run to a concentrator or generally a device which is commonly known as a whey separator 22, from which about 98 per cent of the water issues by the spout 23, while the oil with only about 2 per cent of the water flows through the spout 24 to an oil separator or dehydrator 25, from which through the spout 26 dry oil issues while the very small amount of water trickles out from the spout 27.

The above described arrangement constitutes the most economical and efficient means for carrying out the process that has ever been developed, but so far as the continuity and automatic character of the process is concerned, other arrangements of such apparatus may be used if so desired. The astonishing and striking result of the operation of this apparatus, however, is that milk in quantities measured by hundreds of pounds is run into the series of devices and a clear pure dry oil issues in a constant stream from the last spout 26, from which it is readily collected in cans or other receptacles and sealed up ready for use for storage for indefinite periods or for transportation.

What I claim is—

1. A continuous and automatic process for recovering oil from milk, which consists in warming the milk, separating, washing, cooling and whipping the cream, melting the whipped cream with warm water, freeing this mixture of its water, and delivering the dry oil; these steps being carried on in the sequence named and in such manner that the product of one step is directly and continuously passed to the means for carrying out the next succeeding step, all as herein set forth.

2. A continuous and automatic process of recovering oil from milk, which consists in the following steps carried out in the order named: milk warming, the separation, the washing, the cooling and the whipping of the cream, melting the whipped cream, concentrating the melted fat and drying the same; these steps being carried on without interruption or break in the flow of material from one step to the next and so that all steps are in operation simultaneously.

3. A continuous and automatic process for the recovery of oil from milk which comprises the following steps carried out in the order named: separating the cream from milk, diluting and passing the cream through a cream separator, diluting and passing the washed cream through a third cream separator, passing the doubly washed cream through a cooler, passing the cooled cream through a whipper, delivering the whipped cream to a tank of warm water, passing this water with the melted fat through a fat concentrator or whey separator, passing the concentrated fat through an oil separator or dehydrator, and removing the oil from this device into containers.

4. A continuous and automatic process of recovering oil from milk which consists in separating the cream from the skim milk, washing, cooling and whipping the cream, melting the whipped cream with warm water, concentrating the fat contained in this mixture and then drying the fat; these steps being carried out in such manner that the product of one step is passed to the means for carrying out another directly and without interruption and so that all of the steps are in operation simultaneously.

In testimony whereof I hereto affix my signature.

CHARLES E. NORTH.